P. J. OBERST,
Assignor to T. B. FARRINGTON.
OVERCOAT.
No. 10,384. Reissued Sept. 18, 1883.
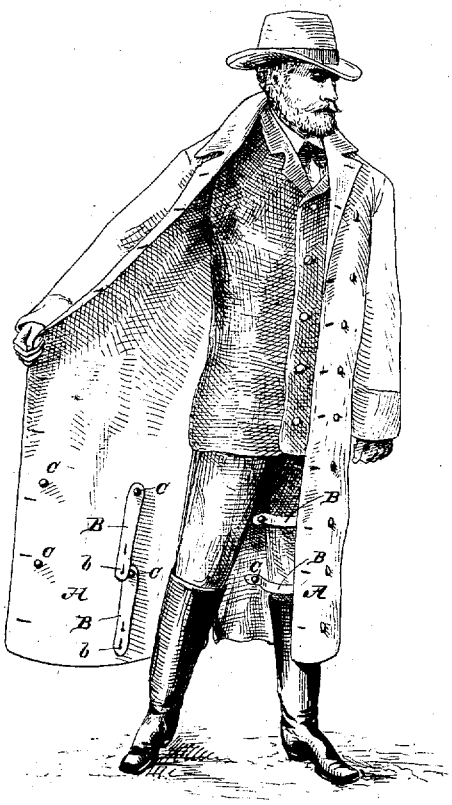
*Witnesses:*
C. C. Poole
D. W. Adams
*Inventor:*
Peter J. Oberst.
per W. E. Dayton
Attorney
N. PETERS, Photo-Lithographer, Washington, D. C.

UNITED STATES PATENT OFFICE.

PETER J. OBERST, OF ST. PAUL, ASSIGNOR TO THOMAS B. FARRINGTON, OF MINNEAPOLIS, MINNESOTA.

OVERCOAT.

SPECIFICATION forming part of Reissued Letters Patent No. 10,384, dated September 18, 1883.

Original No. 265,536, dated October 3, 1882. Application for reissue filed July 2, 1883.

*To all whom it may concern:*

Be it known that I, PETER J. OBERST, of the city of St. Paul, in the county of Ramsey and State of Minnesota, have invented certain new and useful Improvements in Overcoats; and I do hereby declare that the following is a full, clear, and exact description thereof, reference being had to the accompanying drawing, and to the letters of reference marked thereon, which form a part of this specification.

This invention relates to overcoats; and it consists in means applied to the coat for confining the skirts of the coat to or about the legs of the wearer, whereby said skirts are made to better protect the legs of the wearer, either in walking or in horseback riding, in stormy weather.

It also consists in elastic or self-adjusting fastenings for so holding the coat-skirts whereby said fastenings may accommodate themselves to the changing positions of the person.

The devices herein shown for accomplishing these objects consist of straps attached to the inner faces of the coat-skirts, and adapted to pass inside the leg of the wearer, which straps may be elastic or otherwise, as deemed desirable. Said straps are shown as secured to the skirt by means of buttons affixed to the inner faces of the skirt, and button-holes in the ends of the straps, by which the latter may be secured after being adjusted about the leg, as shown.

In riding horseback it is obvious that the ordinary provision of buttons joining the skirts in front to the extreme lower end of the coat will be useless, inasmuch as in this position of the wearer the legs must be spread. The coat must therefore be unbuttoned below the hips, and when so unbuttoned it is difficult or impossible to retain the skirts in position to protect the legs. By my invention each skirt of the coat is independently secured to the adjacent leg of the wearer, so that said skirt may enwrap or cover the leg and protect the same, and this is accomplished without special strain or disfigurement of the garment. In walking, also, this mode of securing the skirts to the several limbs of the wearer is calculated to afford the utmost ease of movement in the limbs, while at the same time affording the greatest possible protection from the weather.

For the purpose of adapting the coat thus contrived for horseback riding, it is of course desirable that the coat shall be slit sufficiently in the rear to allow the same to be disposed in the manner described, and it is preferable that the fastenings be elastic, in order that there may be no drawing or straining of the garment.

Any desired number of straps may be employed, and these or equivalent devices may be arranged to confine the skirt to or about the limbs above as well as below the knee. The straps may also be of any desired length, and the buttons so placed that the skirts may be made to embrace the leg more or less completely.

The drawing presents an illustration of an overcoat embracing my invention and applied to the male figure, one of the skirts being detached from the leg and held out in a manner to reveal the fastenings.

A A are the coat-skirts. B B are straps provided with button-holes *b b*, and C C are buttons affixed to the inner face of the skirts for detachably securing the straps thereto. In fastening the skirts to the legs of the wearer, the straps are loosened at one end, (as shown on the extended skirt,) and passed inside of the leg, after which the detached ends of the straps are again buttoned to the skirt, so as to hold the skirt about the leg, (as also shown in the drawing,) embracing the same more or less fully, according to the length of the straps and the location of the points of their attachment to the skirts.

When the skirts are made to embrace the limbs as described, the coat becomes, in effect, a bifurcated garment, or, in other words, the coat constructed as described is convertible, at pleasure, from an ordinary coat into a combined coat and leggins, or vice versa.

I claim as my invention—

1. A coat having long skirts provided with means for securing them severally to the legs of the wearer, substantially as described.

2. The combination, with the coat-skirts, of straps and means for detachably securing them to the skirts, whereby the skirts may be fastened to the legs of the wearer, substantially as described.

3. In combination with the coat-skirts, elastic straps and means for connecting the same, substantially as described, and for the purposes set forth.

4. A coat convertible at pleasure into a combined coat and leggins, substantially as described.

In testimony that I claim the foregoing as my invention I affix my signature in the presence of two witnesses.

PETER JOSEPH OBERST.

Witnesses:

C. G. LOULAND,

WILLIAM BARRETT.